Dec. 27, 1932.     H. W. SNYDER ET AL     1,891,958
STEAM DOME SHUT-OFF VALVE
Filed May 2, 1928     2 Sheets-Sheet 1

INVENTORS
Herbert W. Snyder
Harry Scheib
BY
Synnestvedt & Lechner
ATTORNEYS

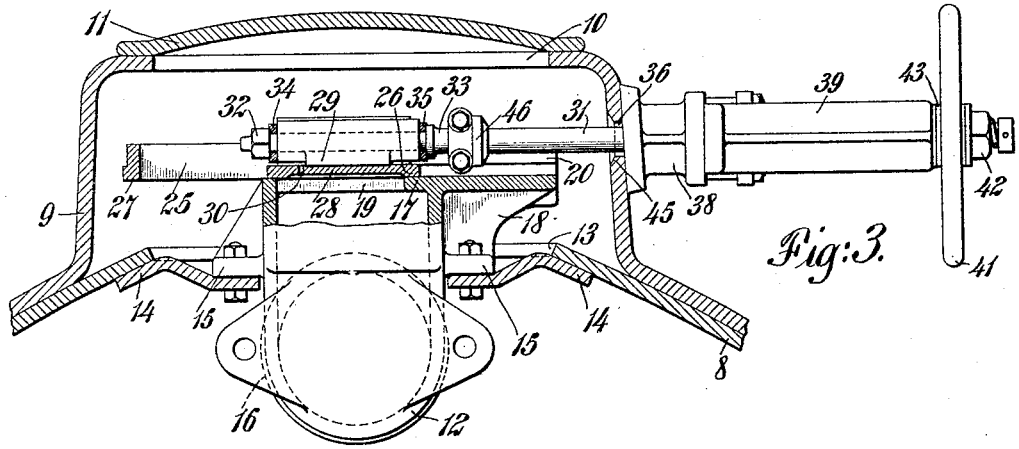
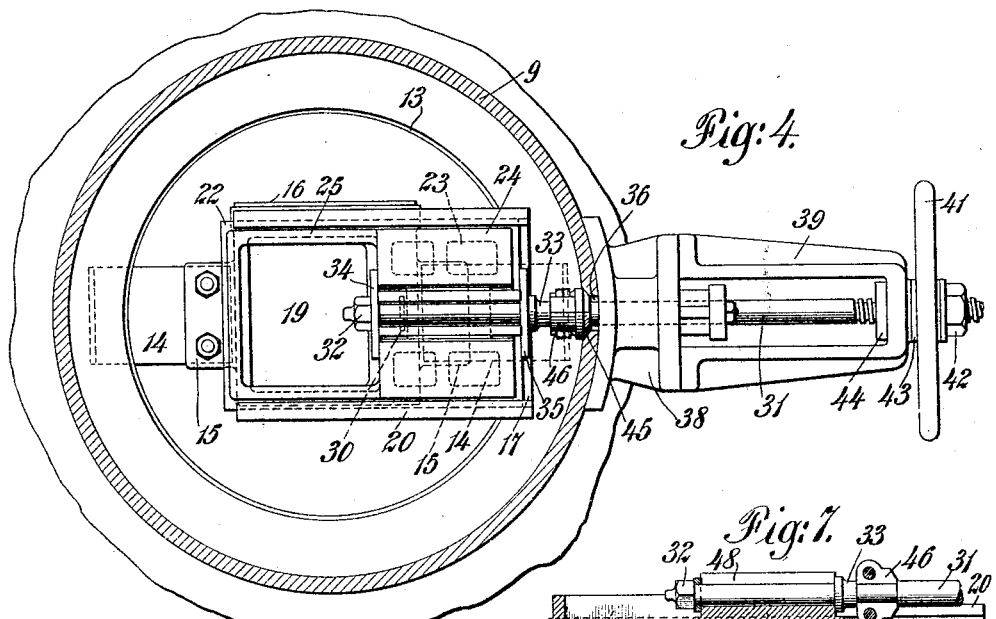
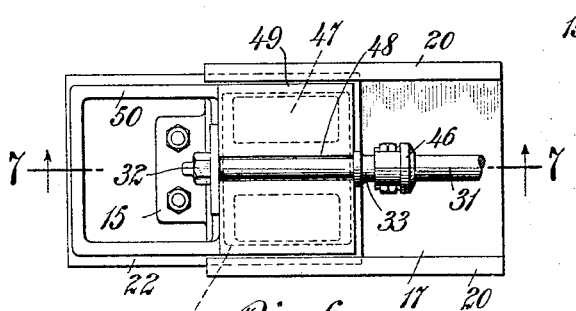

Patented Dec. 27, 1932

1,891,958

UNITED STATES PATENT OFFICE

HERBERT W. SNYDER AND HARRY SCHEIB, OF LIMA, OHIO

STEAM DOME SHUT-OFF VALVE

Application filed May 2, 1928. Serial No. 274,453.

This invention relates to steam dome shut-off valves particularly adapted for use on locomotives in which connection it will be described hereinafter.

In considering the present invention it should be understood at the out set that valves of this type are adapted to cut off the flow of steam from the dome into the steam line only when the locomotive is to remain idle for some period of time, the main throttle of the locomotive serving to control the flow under all normal operating conditions. Shut-off valves, therefore, normally remain open and this condition, heretofore, resulted in corrosion and deterioration of the shut-off valve seats which, of course, remain uncovered and exposed during the normal operation of the locomotive. At times, indeed, this exposure resulted in such a "pocked" or pitted condition that the valve became practically useless.

The present invention contemplates, as one of its objects, the complete elimination of the above difficulty by providing protection for the shut-off valve seat regardless of its position.

Another object of the invention is the provision of means for balancing a valve of this type in order to reduce wear and strains on the valve parts.

The invention also contemplates a valve adapted to serve as a shut-off which is very small in height and which can, therefore, be mounted in a dome having a small overall height. This is becoming increasingly important in view of the fact that locomotives and their boilers are being built larger and consequently higher, this involving reduction in the height of all parts of the locomotive projecting above the boiler in order to keep within standard clearance limitations. The provision of a very low shut-off valve structure is also advantageous in permitting the valve to be mounted at the upper end of the steam off-take or supply line leading to the main throttle or a superheater while, at the same time, keeping the said upper end well up into the steam dome, this latter being important as the steam in the dome is always in the driest condition at a point near the top.

Another, and correlated object of the invention is the provision of an off-take and shut-off valve structure in which the intake end of the off-take opens upwardly into the dome. Such an arrangement also ensures withdrawal of the driest steam from the dome.

The invention also completely overcomes another difficulty which has been encountered in applying valves of this type; i. e., the trouble experienced in bringing the movable valve part within the dome into alignment with the valve operating mechanism which, of course, is mounted either on the outside of the dome or on some other suitable and convenient part of the locomotive. In case an accurate alignment is not accomplished the valve either seats poorly or leaks develop in the packing around the valve operating lever. The foregoing difficulties are completely overcome by the valve construction of the present invention.

More specifically considered the above difficulties are overcome by the use of my improved slide shut-off valve the same being better adapted to alignment with an operating mechanism than shut-off valves of other types. Further toward this end, the invention contemplates the provision of a connecting means between the valve and the operating mechanism which allows for an alignment adjustment.

The present invention still further contemplates the provision of means, in the nature of a valve, for effectively preventing leakage around the shut-off valve operating connection when the said shut-off valve is in its normal or open position and the locomotive is in operation.

Finally the invention contemplates a shut-off valve structure which is simple and rugged in construction, readily applied, inspected or repaired, effective in operation and easily adjusted.

How the foregoing objects and advantages are obtained will be clear from the following description when considered in connection with the accompanying drawings which illustrate the preferred and a modified embodiment of the invention.

Of the drawings, Fig. 1 is a vertical sectional view of the steam dome of a locomotive, a portion of the boiler shell and the preferred embodiment of the valve of the present invention mounted within the dome, certain parts of the valve structure being shown in elevation;

Figs. 3 and 4 are views similar to Figs. 1 and 2, respectively, but showing the valve in different positions;

Fig. 6 is a plan view of a modification of the valve structure; and

Fig. 7 is a view taken substantially on the line 7—7 of Fig. 6.

Figure 1:
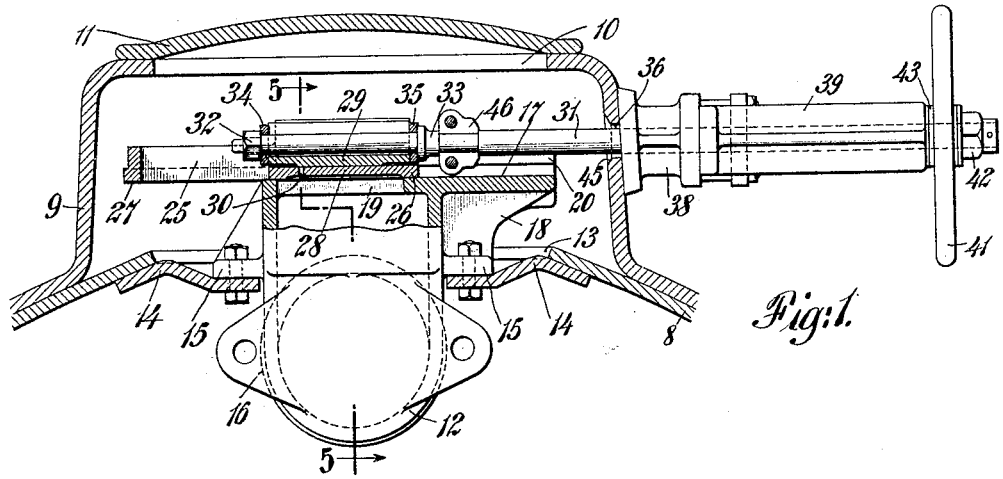

Referring now particularly to Figs. 1-5, the reference numeral 8 indicates a portion of a locomotive boiler shell and 9 indicates the steam dome which may be secured to the shell in any suitable manner. Note that the dome has a small overall height and is provided with an opening 10 in its flat top which is normally closed by a suitable cover or lid 11.

The steam off-take or supply pipe 12 extends upwardly into the dome through an opening 13 in the boiler shell 8. The pipe 12 is supported in position by the apertured lugs 15 which are bolted to supporting tongues 14, the latter being secured to the shell 8 in any suitable manner. At its lower end the pipe 12 is formed with an elbow at the extremity of which suitable connection means 16 are provided for coupling a line leading to the throttle or a superheater. At its upper end which is squared the pipe 12 is provided with a flat upwardly open valve seat 17. This seat 17 is extended some distance beyond one edge of the pipe 12, the extension being strengthened by the webs 18. The opening 19 in the seat serves for admission of steam to the off-take.

Figure 5:
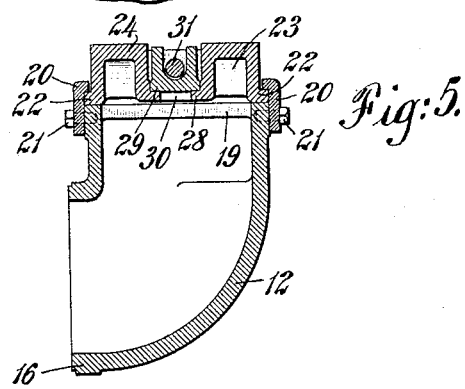
Fig. 5 is a detail sectional view taken as indicated by the line 5—5 of Fig. 1.

Valve guides or plates 20 are secured to the pipe 12 by bolts 21 (see Fig. 5). These guides extend all the way along the side edges of the seat 17 and project upwardly and over the seat to provide grooves adapted to receive the lips 22 extending laterally from the lower edge of the valve 23.

The valve 23 comprises a body portion 24 slightly larger than the opening 19 in the valve seat and an open frame portion 25 extended therefrom. The body portion has a machined surface 26 extending around it which is adapted to contact with the seat 17 and close the opening 19 therein. The frame portion is provided with a similar machined surface 27 adapted to contact with the seat 17 when the valve is in open position.

Centrally and longitudinally disposed in the body 24 is a seat 28 for the balancing valve 29. A port 30 through the seat 28 is adapted to be controlled by the balancing valve 29.

The valve operating mechanism comprises a shaft 31 one end of which is adapted to be received in a trough-shaped cavity in the balancing valve 29. It is to be noted (see Fig. 5, particularly) that this trough-like cavity in the top of the valve 29 is made substantially larger than the shaft 31. This clearance allows for any disalignment which may occur between the valve structure and its operating member. The valve 29 is rigidly secured to the shaft 31 by clamping it between plates 34 and 35, these plates in turn being clamped between the stop 33, spaced from the end of the shaft, and the nut 32 threaded onto its end. Note that the ends of the plates 34 and 35 extend outwardly over the ends of the valve body 24 and also that these plates are spaced apart a distance which is slightly greater than the length of the valve body.

The operating shaft 31 extends outwardly through an opening 36 in the dome 8 and a packing gland 37 of any suitable character which is housed in a centering and supporting member 38 secured to the outside of the dome. A bracket member 39 extends outwardly from the member 38 and is provided with an opening adapted to receive the flanged collar 40 which is threaded onto the outer end of the shaft 31 (see Fig. 2). The hand wheel 41, or any other suitable manually operable control, is secured to the collar 40 to rotate therewith, the nut 42 serving to retain the hand wheel in place. As shown in Figs. 1-4 the apertured end of the bracket 39 is positioned between the hub 43 of the wheel 41 and the flange 44 of the collar 40. Thus the collar and the hand wheel are secured as against longitudinal movement and if the hand wheel be rotated the operating shaft 31 moves longitudinally.

A valve seat 45 is provided on the inside of the dome 8 around the opening 36. This seat is adapted to receive the split plug valve 46 which is secured in a reduced area or groove on the shaft 31 adjacent to the stop 33.

Figure 2:
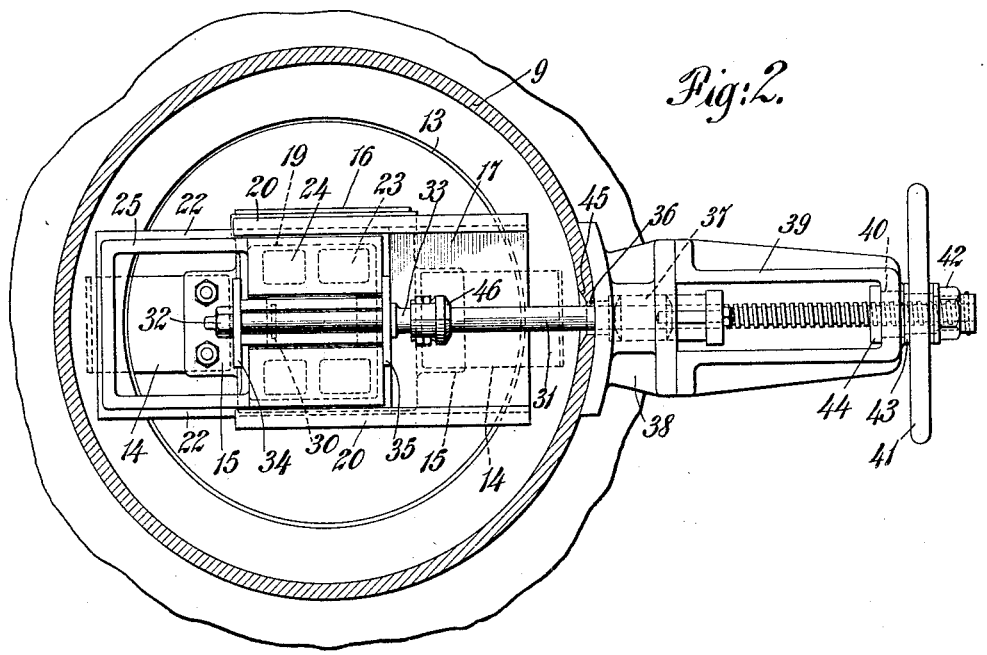
Fig. 2 is a horizontal sectional view through the dome looking downwardly on the valve structure which appears in plan.

The operation of the structure is as follows:

Assuming that the valve is in closed position, as in Figs. 1 and 2, and it is desired to open the same; the hand wheel 41 is rotated in a direction to cause the shaft 31 to move outwardly or to the right. This shaft movement draws the balancing valve to the right and uncovers the port 30 in the valve body 24 (see Fig. 3). Steam now passes from the dome space through the port 30 into the supply pipe 12 and thus equalizes the pressure on both sides of the valve. In this balanced condition the valve 23 may be moved on its seat very readily. Such movement follows shortly after the valve 29 has uncovered the port 30, the same being effected by means of the projecting ends of the plate 34 which advance with the balancing valve to engage the left end of the valve body 24. As the valve is drawn open the open frame 25 takes the position on the valve seat which was occupied by the ground surface 26 of the valve body 24 (see Fig. 4). In the full open position, as shown in Fig. 4, the plug valve 46 completely closes the opening 36 by its engagement with the seat 45 therearound.

Closing of the valve is accomplished, of course, by rotating the hand wheel 41 to cause the shaft 31 to move to the left and it should be noted that the balancing valve plays no part in the closing movement as the pressures on both sides of the valve will be equal during such movement and, indeed, until steam leaks or is exhausted from the off-take 12.

In the modification of Figs. 6 and 7, the off take structure is the same as in the preferred embodiment, but the shut-off valve structure is somewhat modified. According to this arrangement a shut-off valve 47 is mounted on the seat 17, and it should be noted that the balancing valve mechanism has been omitted. The operating shaft 31 is received in a trough-shaped cavity 48 in the valve body 49 itself, the latter being clamped between the stop 33 and the nut 32. An open frame member 50 for protecting the valve seat 17 is carried by the valve body 49 as before. The plug valve mechanism 46 is also included in this modification.

In conclusion it should be observed that when the shut-off valve is open and the locomotive is in operation the valve seat 17 is fully protected against corrosion by the ground surface 27 of the frame 25. Thus the valve, although open, at times, for long periods, is always in good condition and ready for operation. It is to be observed, further, that the plug valve 46 effectively prevents leakage around the shaft 31 during all normal operation of the locomotive. Still further, it should be noted that the improved structure, having an off-take with upwardly open intake end and a relatively low shut-off valve, ensures withdrawal from the dome of the driest steam. Finally, it should be noted that the whole valve structure is simple and rugged, has a small overall height and realizes the advantages (pointed out hereinbefore) which are incident to the low construction.

We claim:—

1. In a locomotive the combination of a steam dome, an off-take having an upwardly open intake end positioned well up into the dome, a normally open slide valve adapted to seat on said upwardly open end, and a control means for the valve including an operating stem extended through a dome wall, said valve being relatively adjustable with respect to the stem so as to permit alignment and firm seating thereof on said upwardly open end, together with a frame movable with said valve which is adapted to rest upon and protect the valve seat while the valve is in open position.

2. In a locomotive the combination of a steam dome, an off-take having an upwardly open intake end positioned well up into the dome, a valve seat at said open end, a normally open slide valve cooperating with said seat, and a control means for the valve including an operating stem extended through a dome wall, said seat being extended to one side of the off-take to contact with said valve when it occupies its open position and said valve being relatively adjustable with respect to the stem so as to permit alignment and firm seating thereof on said seat, together with a frame movable with said valve which is adapted to rest upon and protect the valve seat while the valve is in open position.

3. In a locomotive the combination of a steam dome, an off-take having an upwardly open intake end positioned well up into the dome, a valve seat at said open end, a normally open slide valve cooperating with said seat, and having a balancing port therein, a balancing valve for controlling said port, and a control means for said valves including an operating stem extended through a dome wall and associated with said valves in such manner as to provide opening of the balancing valve before opening of said slide valve when the said control means is actuated to move the valves from closed to open position, said control means being relatively adjustable with respect to said slide valve so as to permit alignment and firm seating thereof on the valve seat.

4. In a locomotive the combination of a steam dome, an off-take having an upwardly open intake end positioned well up into the dome, a valve seat at said upwardly open end, a normally open valve cooperating with said seat, and a control means for the valve including an operating stem extended through a dome wall, said valve being relatively adjustable with respect to the stem so as to permit alignment and firm seating thereof on said seat, together with a valve seat protecting device movable with the valve and contacting with said seat when the valve is in open position.

5. In a locomotive the combination of a steam dome, an off-take having an upwardly open intake end positioned well up into the dome, a normally open steam dome shut-off valve mechanism including a slide valve adapted to seat on said upwardly open end and being movable generally horizontally, and a control means for the valve including an operating stem extending generally laterally therefrom through a dome wall, said valve being relatively movable with respect to the stem so as to permit firm seating thereof on said upwardly open end under the influence of the steam pressure.

In testimony whereof we have hereunto signed our names.

HERBERT W. SNYDER.
HARRY SCHEIB.